United States Patent
Nishiyama

(10) Patent No.: US 9,389,816 B2
(45) Date of Patent: Jul. 12, 2016

(54) IMAGE FORMING APPARATUS THAT TRANSMITS AND RECEIVES MAINTENANCE WORK DATA TO AND FROM INFORMATION PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Masashi Nishiyama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/459,592

(22) Filed: Aug. 14, 2014

(65) Prior Publication Data
US 2015/0049363 A1    Feb. 19, 2015

(30) Foreign Application Priority Data

Aug. 14, 2013    (JP) .................................. 2013-168571

(51) Int. Cl.
*G06F 3/12* (2006.01)
*G03G 15/00* (2006.01)
(Continued)

(52) U.S. Cl.
CPC .......... *G06F 3/1236* (2013.01); *G03G 15/5079* (2013.01); *G06F 3/1204* (2013.01);
(Continued)

(58) Field of Classification Search
CPC ................ G03G 15/5079; G03G 2215/00109; G06F 3/1204; G06F 3/1225; G06F 3/1236; G06F 3/1287; G06Q 10/20; H04N 1/00061

USPC .................................................. 358/1.1–1.9
See application file for complete search history.

(56) References Cited

U.S. PATENT DOCUMENTS 5,303,005 A * 4/1994 Takano et al. ..................... 399/8
8,813,059 B2 * 8/2014 Sasaki ........................... 717/168
(Continued)

FOREIGN PATENT DOCUMENTS

JP    H10207658 A    8/1998
JP    2003076533 A    3/2003
(Continued)

OTHER PUBLICATIONS

Nobuhito Miyauchi, "Allround Internet Telephony Protocol: HTTP-based Conference Application Protocol" (Special Issue on High Speed Networks and Multimedia Applications) Information Processing Society of Japan Journal, vol. 44 No. 3, pp. 553-560, Mar. 2003.
(Continued)

*Primary Examiner* — King Poon
*Assistant Examiner* — Ibrahim Siddo
(74) *Attorney, Agent, or Firm* — Rossi, Kimms & McDowell LLP

(57) ABSTRACT

An information processing apparatus without bothering a user, even when it is necessary to disconnect and restart the image forming apparatus which has been connected to the information processing apparatus so as to transmit and receive maintenance work data for performing the maintenance work on the image forming apparatus. When the image forming apparatus is required to be disconnected and reconnected after restarting the image forming apparatus during connection with the information processing apparatus, identification information for identifying an information processing apparatus to be reconnected is stored in a storage section. The image forming apparatus is reconnected to the information processing apparatus identified by the identification information stored in the storage section after the image forming apparatus is restarted.

6 Claims, 6 Drawing Sheets

(51) Int. Cl.
*G06Q 10/00* (2012.01)
*H04N 1/00* (2006.01)

(52) U.S. Cl.
CPC ............ *G06F 3/1225* (2013.01); *G06F 3/1287* (2013.01); *G06Q 10/20* (2013.01); *H04N 1/00344* (2013.01); *H04N 1/00917* (2013.01); *H04N 1/00928* (2013.01); *G03G 2215/00109* (2013.01)

(56) References Cited

U.S. PATENT DOCUMENTS

| | | | |
|---|---|---|---|
| 2002/0194214 A1* | 12/2002 | Fukazawa | H04N 1/00002 715/229 |
| 2004/0260704 A1 | 12/2004 | Moore | |
| 2005/0044248 A1* | 2/2005 | Mihira et al. | 709/229 |
| 2007/0005157 A1 | 1/2007 | Tanimoto | |
| 2007/0058196 A1* | 3/2007 | Nagahara et al. | 358/1.15 |
| 2007/0300291 A1 | 12/2007 | Bomgaars et al. | |
| 2008/0104252 A1 | 5/2008 | Henniger | |
| 2009/0089457 A1 | 4/2009 | Zhan | |
| 2010/0088416 A1* | 4/2010 | Kurita | H04L 63/0815 709/227 |
| 2011/0099272 A1 | 4/2011 | Takahashi | |
| 2013/0042232 A1* | 2/2013 | Hirokawa | 717/174 |
| 2013/0321849 A1* | 12/2013 | Masui et al. | 358/1.14 |

FOREIGN PATENT DOCUMENTS

| | | |
|---|---|---|
| JP | 2005208974 A | 8/2005 |
| JP | 2007221709 A | 8/2007 |
| JP | 2010093585 A | 4/2010 |
| JP | 2011091773 A | 5/2011 |
| JP | 2013093651 A | 5/2013 |

OTHER PUBLICATIONS

European Office Action issued in application No. EP14180773.5, dated Jan. 8, 2016.
Extended European Search Report issued in counterpart application No. EP14180774.3, dated Feb. 26, 2015.
Extended European Search Report issued in application No. EP14180773.5, dated Feb. 26, 2015.

* cited by examiner

FIG. 3A

CALL CENTER CONNECTION INFORMATION

| SESSION MANAGEMENT SERVER URL | http://aaa |
|---|---|
| FIRST-TIME CONNECTION DESTINATION TERMINAL ID | Tokyo-Helpdesk |

FIG. 3B

START-TIME REDIAL SETTING INFORMATIONN

| START-TIME REDIAL MODE | ON |
|---|---|
| REDIAL DESTINATION TERMINAL ID | Tokyo-CE111 |
| REDIAL MODE EXPIRATION DATE AND TIME | DEC. 10, 2012, 12:10 |
| REMAINING NUMBER OF EXECUTIONS OF REDIAL MODE | 1 |

IMAGE FORMING APPARATUS THAT TRANSMITS AND RECEIVES MAINTENANCE WORK DATA TO AND FROM INFORMATION PROCESSING APPARATUS, METHOD OF CONTROLLING THE SAME, AND STORAGE MEDIUM

BACKGROUND OF THE INVENTION

1. Field of the Invention

The present invention relates to an image forming apparatus that transmits and receives maintenance work data to and from an information processing apparatus, a method of controlling the same, and a storage medium.

2. Description of the Related Art

For current image forming apparatuses, there has been proposed a remote maintenance service using voice and moving image communication, and remote control (see e.g. Japanese Patent Laid-Open Publication No. 2005-208974). In the remote maintenance service, when an image forming apparatus suffers from an error, it is possible to solve the problem by directly telling a user how to eliminate the error from a call center without sending a service person to the user's site for repair. This makes it possible to reduce time required to eliminate the error.

In this remote maintenance service, it is effective for a user to achieve connection with the call center by using a communication unit of the image forming apparatus without using an apparatus other than the image forming apparatus, such as a telephone and a PC.

In view of this, there has been proposed a technique for providing an image forming apparatus with a communication unit that is compatible with SIP (Session Initiation Protocol), and transmitting and receiving moving image data and voice data to and from another information terminal connected to the Internet by a session established using SIP (see e.g. Japanese Patent Laid-Open Publication No. 2007-221709).

To establish a SIP session through a firewall introduced to an office, there is a high possibility that infrastructure improvement, such as provision of SIP proxy, is required. Some offices may have difficulty in introducing SIP because of the capital investment required for this.

To solve this problem, there has been proposed a technique for establishing a session between information terminals using HTTP having high compatibility with a firewall (see e.g. Allround Internet Telephony Protocol: HTTP-based Conference Application Protocol (Special Issue on High Speed Networks and Multimedia Applications) IPSJ (Information Processing Society of Japan) Journal 44(3), 553-560, 2003-03-15).

Access from the Internet side to an information terminal protected by a firewall is limited. On the other hand, access from the information terminal side inside the firewall to the Internet is allowed when HTTP having high compatibility with the firewall is used.

Therefore, in the above-mentioned IPSJ Journal 44(3), 553-560, two information terminals separated from each other by the firewall achieve session establishment therebetween by accessing a session management server, to which each information terminal can connect as an HTTP client, from the information terminal side, respectively.

In the remote maintenance service, the image forming apparatus is sometimes required to be restarted according to an instruction or an operation from the call center side depending on the details of maintenance and the details of a trouble. For example, the image forming apparatus is required to be restarted e.g. in a case where the setting change has been made which becomes effective only after the restart.

In a case where the remote maintenance service is carried out using the conventional technique, when the image forming apparatus is subjected to restarting, a session between the image forming apparatus and the session management server is temporarily disconnected, but there is a case where the remote maintenance is desired to be continued also after the restart so as to confirm the changed settings and continue the maintenance work.

In the conventional technique, to establish a session again after a session between the two information terminals and the session management server is temporarily disconnected, it is necessary to reconnect from the information terminal side to the session management server.

Therefore, to continue the remote maintenance work, the user of the image forming apparatus is required to perform the operation for connecting from the image forming apparatus to the session management server again.

If the user is away from the image forming apparatus, the user is called by another apparatus, such as an ordinary telephone, and is requested to move to the image forming apparatus to perform a reconnection operation, which consumes the user's time.

Further, if the situation is inconvenient to the user, and hence the user is not available, the reconnection operation is not executed, and hence a session cannot be established, which makes it impossible to perform the remote maintenance.

SUMMARY OF THE INVENTION

The present invention provides an image forming apparatus that is capable of reconnecting to an information processing apparatus without bothering a user, even when it is necessary to disconnect and restart the image forming apparatus which has been connected to the information processing apparatus so as to transmit and receive maintenance work data for performing maintenance work on the image forming apparatus, a method of controlling the same, and a storage medium.

In a first aspect of the present invention, there is provided an image forming apparatus that connects to an information processing apparatus, and transmits and receives maintenance work data for performing maintenance work on the image forming apparatus, including voice data or moving image data, to and from the information processing apparatus, comprising a storage unit configured to store, in a case where during connection with the information processing apparatus, the image forming apparatus is required to be disconnected and reconnected after restarting the image forming apparatus, identification information for identifying an information processing apparatus to be reconnected, in a storage section, a restart unit configured to restart the image forming apparatus, and a reconnection unit configured to reconnect to the information processing apparatus identified by the identification information stored by the storage unit after the image forming apparatus is restarted by the restart unit.

In a second aspect of the present invention, there is provided a method of controlling an image forming apparatus that connects to an information processing apparatus, and transmits and receives maintenance work data for performing maintenance work on the image forming apparatus, including voice data or moving image data, to and from the information processing apparatus, comprising storing, in a case where during connection with the information processing apparatus, the image forming apparatus is required to be disconnected and reconnected after restarting the image forming apparatus, identification information for identifying an information processing apparatus to be reconnected, in a storage section, restarting the image forming apparatus, and reconnecting to the information processing apparatus identified by the identification information stored by said storing after the image forming apparatus is restarted by said restarting.

In a third aspect of the present invention, there is provided a non-transitory computer-readable storage medium storing a computer-executable program for executing a method of controlling an image forming apparatus that connects to an information processing apparatus, and transmits and receives maintenance work data for performing maintenance work on the image forming apparatus, including voice data or moving image data, to and from the information processing apparatus, wherein the method comprises storing, in a case where during connection with the information processing apparatus, the image forming apparatus is required to be disconnected and reconnected after restarting the image forming apparatus, identification information for identifying an information processing apparatus to be reconnected, in a storage section, restarting the image forming apparatus, and reconnecting to the information processing apparatus identified by the identification information stored by said storing after the image forming apparatus is restarted by said restarting.

According to the present invention, in a case where it is necessary to disconnect and restart the image forming apparatus which has been connected to the information processing apparatus so as to transmit and receive maintenance work data for performing the maintenance work on the image forming apparatus, identification information for identifying the information processing apparatus to which the image forming apparatus is to be reconnected is stored in the storage section, and the image forming apparatus reconnects to the information processing apparatus identified by the stored identification information upon restarting the image forming apparatus. Therefore, it is possible to reconnect the image forming apparatus to the information processing apparatus without bothering a user.

Further features of the present invention will become apparent from the following description of exemplary embodiments (with reference to the attached drawings).

BRIEF DESCRIPTION OF THE DRAWINGS

FIG. 3A is a diagram showing call center connection information.

FIG. 3B is a diagram showing start-time redial setting information.

DESCRIPTION OF THE EMBODIMENTS

The present invention will now be described in detail below with reference to the accompanying drawings showing embodiments thereof.

Figure 1:
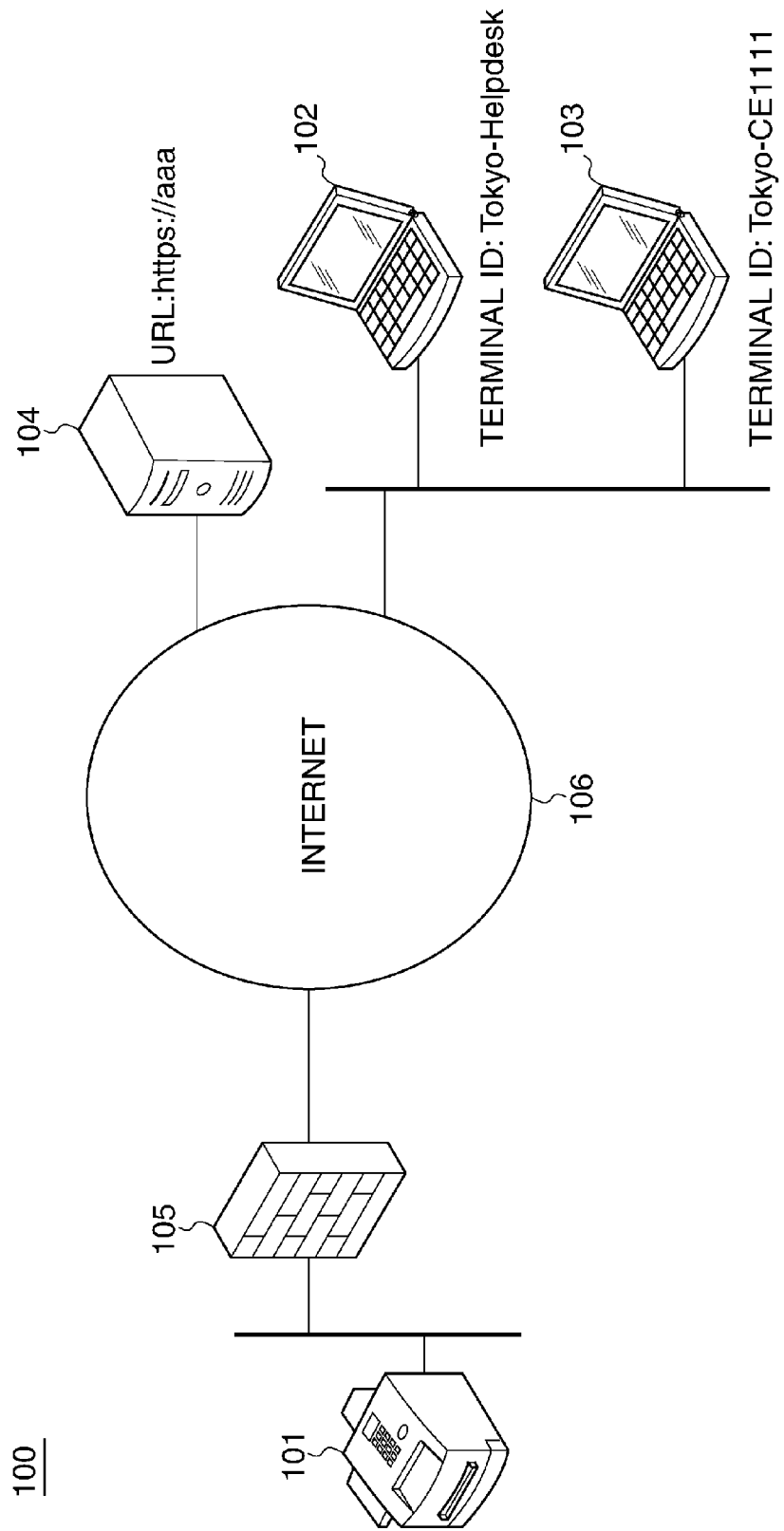
FIG. 1 is a schematic diagram of a remote maintenance system including an image forming apparatus according to an embodiment of the present invention.

FIG. 1 is a schematic diagram of a remote maintenance system 100 including an image forming apparatus 101 according to an embodiment of the present invention.

Referring to FIG. 1, the remote maintenance system 100 is comprised of the image forming apparatus 101, a firewall 105, the Internet 106, a session management server 104, and call center terminals 102 and 103.

Out of these, the image forming apparatus 101, and the call center terminals 102 and 103 are each equipped with a communication function as an HTTP client. Further, the image forming apparatus 101, and the call center terminals 102 and 103 each have a remote maintenance function using e.g. voice and moving image communication, and remote control, and operate as communication partners in the remote maintenance.

The image forming apparatus 101 accesses the session management server 104 connected to the Internet 106 via the firewall 105, by using HTTP.

Further, the image forming apparatus 101 designates a terminal ID of a call center terminal for the session management server 104, to thereby call the designated call center terminal and establish a session therewith. Then, the image forming apparatus 101 transmits and receives data to and from the called call center terminal via the session management server 104.

The session management server 104 is equipped with a communication function as an HTTP server. The session management server 104 manages sessions between the image forming apparatus 101 and the call center terminals 102 and 103.

The call center terminals 102 and 103 connect to the session management server 104 by using HTTP. In the present embodiment, the call center terminal 102 is a terminal which is operated by a receiving operator of the call center, as a reception terminal for receiving access from the image forming apparatus 101. Further, the call center terminal 102 dispatches a session established first with the image forming apparatus 101 to the call center terminal 103 as a maintenance terminal for performing maintenance work.

On the other hand, the call center terminal 103 is a terminal operated by a maintenance operator at the call center as the maintenance terminal for performing maintenance work on the image forming apparatus 101. The call center terminal 103 performs remote maintenance of the image forming apparatus 101, by voice and moving image communication and remote control, in the session with the image forming apparatus 101 dispatched from the call center terminal 102.

Although in the present embodiment, the HTTP protocol is used for connection between the image forming apparatus 101 and the session management server 104, any other communication protocol having high compatibility with a firewall may be used.

Similarly, although in the present embodiment, the HTTP protocol is used for connection between the call center terminals 102 and 103 and the session management server 104, any other communication protocol may be used.

Further, although in the present embodiment, data transmission and reception between the image forming apparatus 101 and the call center terminals 102 and 103 is performed via the session management server 104, a communication path directly connecting from the image forming apparatus to the call center terminals may be established separately. As described above, the image forming apparatus 101 according to the present embodiment accesses the information processing apparatuses (call center terminals 102 and 103) to transmit and receive maintenance work data including voice data and moving image data for performing the maintenance work on the image forming apparatus 101 to and from the information processing apparatuses. In the present embodiment, the above-mentioned voice data and moving image data, and data for remote control are used as the maintenance work data.

Figure 2:
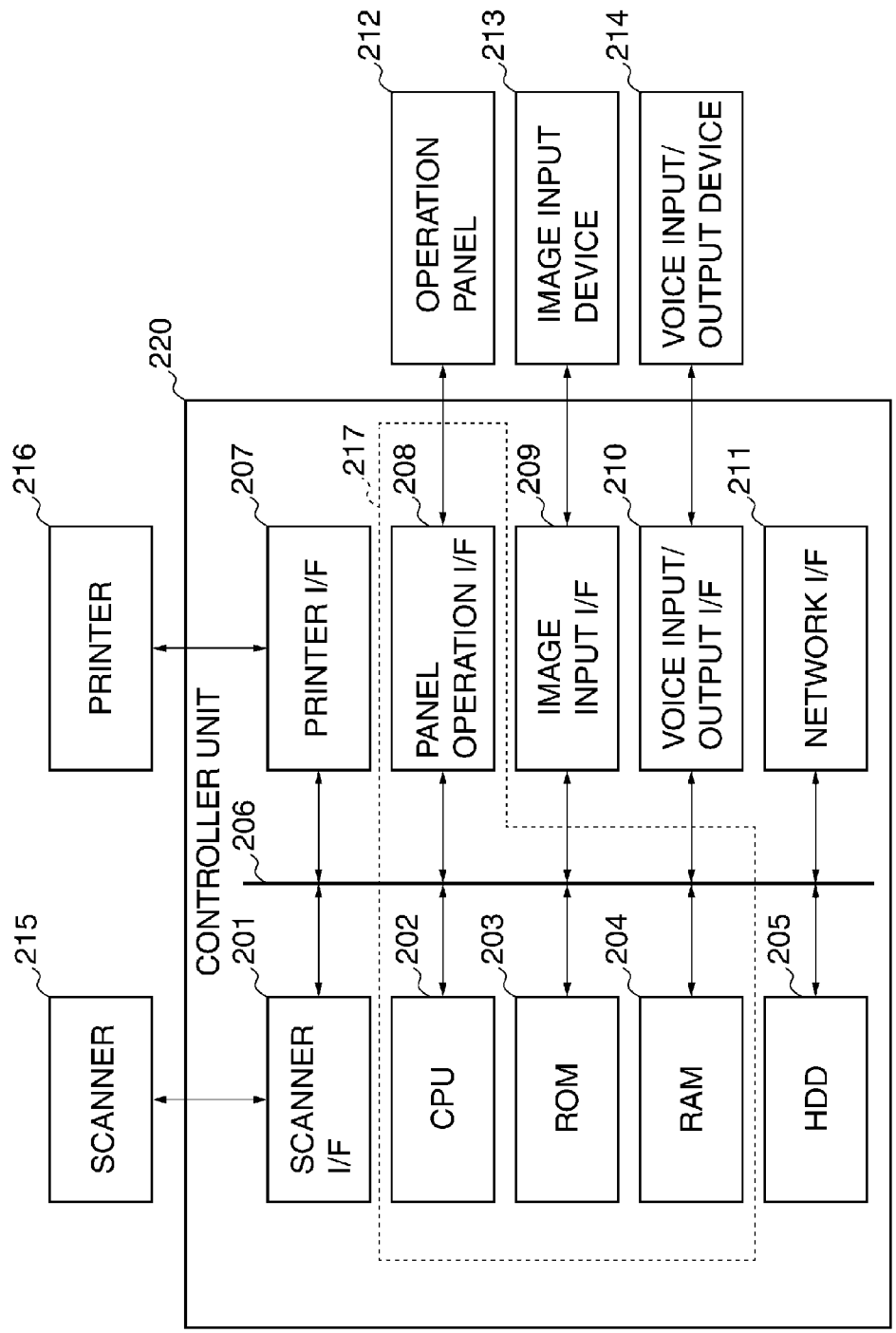
FIG. 2 is a block diagram of the hardware configuration of the image forming apparatus appearing in FIG. 1.

FIG. 2 is a block diagram of the hardware configuration of the image forming apparatus 101 appearing in FIG. 1.

Referring to FIG. 2, the image forming apparatus 101 is comprised of a controller unit 220, a scanner 215, a printer 216, an operation panel 212, an image input device 213, and a voice input/output device 214.

Further, the controller unit 220 is comprised of a scanner interface 201, a CPU 202, a ROM 203, a RAM 204, an HDD 205, a printer interface 207, a panel operation interface 208, an image input interface 209, a voice input/output interface 210, and a network interface 211, which are connected to each other via a system bus 206.

Figure 5:
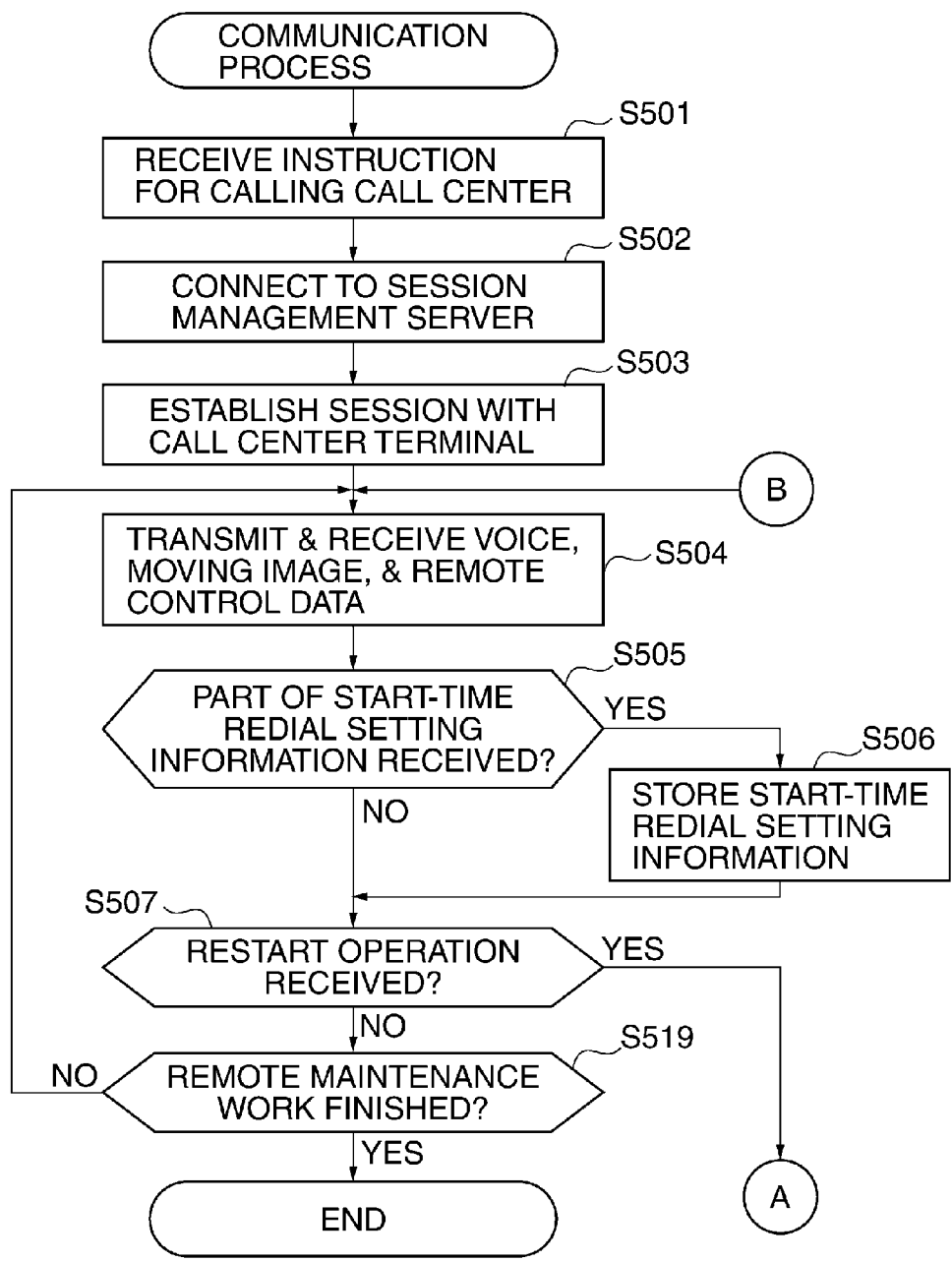
FIG. 5 is a flowchart of a communication process for communicating with call center terminals, which is executed by a CPU appearing in FIG. 2.
Figure 6:
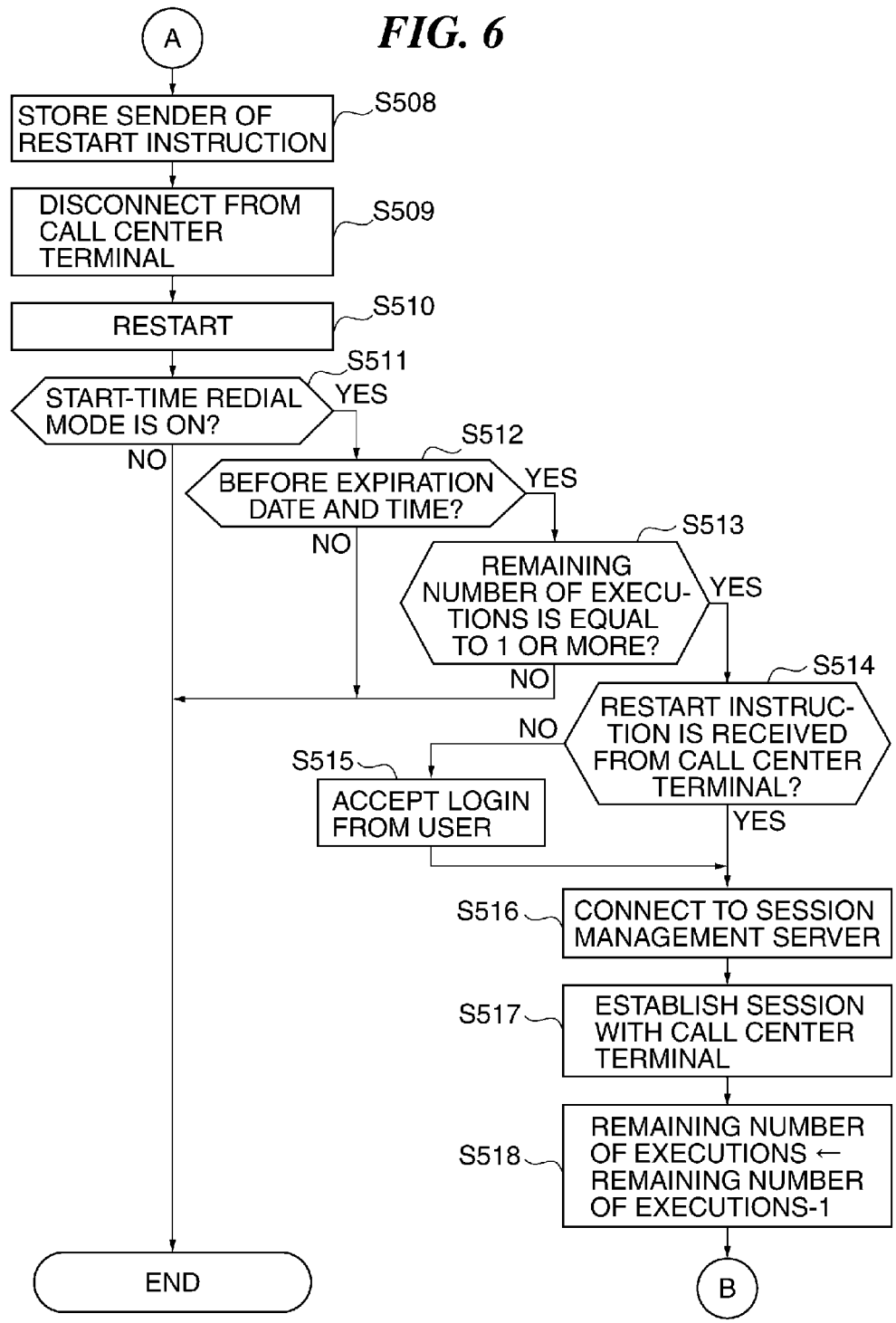
FIG. 6 is a continuation of FIG. 5.

The CPU 202 performs centralized control of access to various devices connected to the system bus 206 based on a control program stored in the ROM 203 or the HDD 205 to thereby control the overall operation of the image forming apparatus 101. A communication process, described hereinafter with reference to FIGS. 5 and 6, is a process executed by loading a program stored in the HDD 205 into the RAM 204 by the CPU 202.

The RAM 204 mainly functions as a main memory and a work area for the CPU 202, and can expand its memory capacity by connecting an optional RAM to an expansion port, not shown.

The HDD 205 stores a boot program, various application programs, font data, user files, editing files, and so forth. Note that not only the HDD 205, but also an SD card, a flash memory, or the like may be used as an external storage device.

The scanner interface 201 controls input of an image from the scanner 215. The printer interface 207 controls output of an image to the printer 216. The panel operation interface 208 receives an operation from a user, and controls display on the operation panel 212 which displays information and input of various setting information set on the operation panel 212.

The image input interface 209 controls input of an image from the image input device 213, such as a camera. The voice input/output interface 210 controls input and output of a voice from and to the voice input/output device 214, such as a head set. The network interface 211 performs data communication with an external network via a network cable.

The image forming apparatus 101 described above is capable of operating in two operating modes: a normal mode in which electric power is supplied to all of units of the image forming apparatus 101, shown in FIG. 2, and a power-saving mode in which electric power is supplied only to a block 217 of several units.

FIG. 3A is a diagram showing call center connection information, and FIG. 3B is a diagram showing start-time redial setting information. These are stored in the HDD 205.

Referring to FIG. 3A, the call center connection information is formed by a session management server URL and a first-time connection destination terminal ID. The session management server URL indicates a URL of the session management server 104. The first-time connection destination terminal ID indicates a terminal ID of one of call center terminals which is to be accessed first, and in the present embodiment, it indicates the terminal ID of the call center terminal 102.

Referring to FIG. 3B, the start-time redial setting information is formed by a start-time redial mode, a redial destination terminal ID, a redial mode expiration date and time, and the remaining number of executions of the redial mode.

The start-time redial mode indicates whether or not a session controller 302 is to automatically establish a session with a redial destination terminal indicated by the redial destination terminal ID at the start of the image forming apparatus 101. When the start-time redial mode is on, the session is established, whereas when the start-time redial mode is off, the session is not established.

The redial mode expiration date and time indicates a limit of time during which the session controller 302 can automatically establish a session with the redial destination terminal indicated by the redial destination terminal ID.

Therefore, if the start-time redial mode is on and also the date and time of the restart is before the expiration date and time, a session is automatically established.

The remaining number of executions of the redial mode indicates the remaining number of times at which a session can be automatically established. The remaining number of executions of the redial mode is decremented by 1 whenever a session is automatically established.

In a case where the remaining number of executions of the redial mode is equal to 0, even when the start-time redial mode is on, a session is never automatically established.

Figure 4:
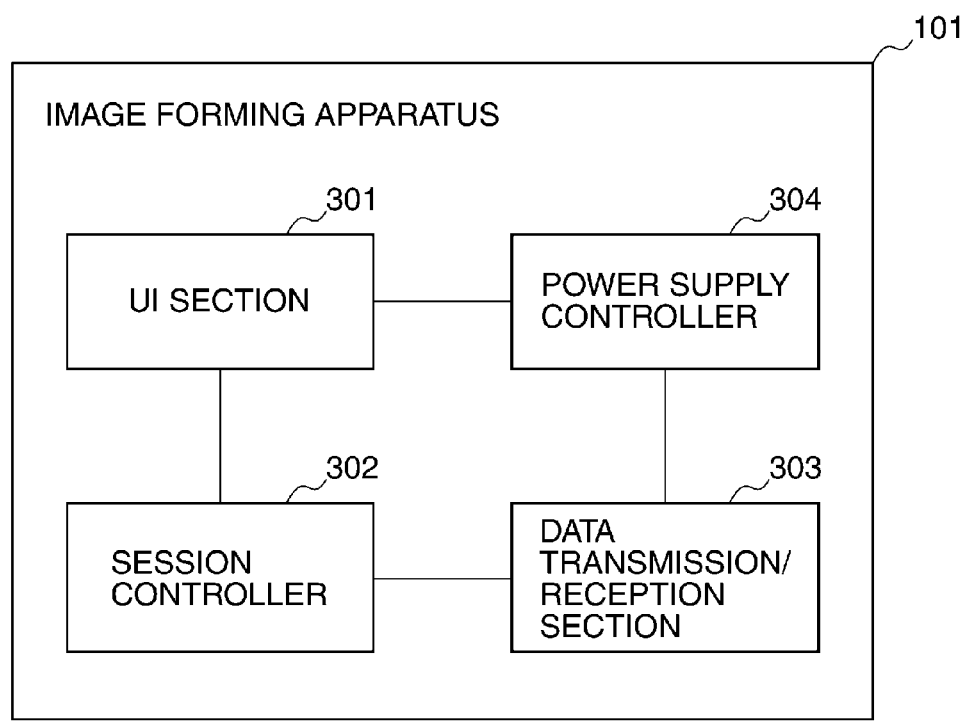
FIG. 4 is a block diagram of the software configuration of the image forming apparatus appearing in FIG. 1.

FIG. 4 is a block diagram of the software configuration of the image forming apparatus 101 appearing in FIG. 1.

Referring to FIG. 4, the image forming apparatus 101 is comprised of a user interface (UI) section 301, the session controller 302, a data transmission/reception section 303, and a power supply controller 304. These sections are realized by loading programs stored in the HDD 205 into the RAM 204 and executing the loaded programs by the CPU 202.

The user interface section 301 controls display on the operation panel 212 and input of various setting information set on the operation panel 212, via the panel operation interface 208.

The session controller 302 accesses the session management server 104 via the network interface 211 according to the setting of the call center connection information shown in FIG. 3A, which is stored in the HDD 205.

The data transmission/reception section 303 transmits and receives data, such as voice data, moving image data, remote control data, and information included in the redial setting information, in a session established by the session controller 302 via the network interface 211.

Further, the data transmission/reception section 303 controls the voice input/output interface 210, the image input interface 209, the panel operation interface 208, and so forth, as required. The power supply controller 304 performs control concerning the power supply, such as control performed when shutdown is instructed e.g. by a user through switching-off of the power switch, and control of where to supply power.

FIG. 5 is a flowchart of a communication process for communicating with the call center terminals 102 and 103, which is executed by the CPU 202 appearing in FIG. 2, and FIG. 6 is a continuation of FIG. 5.

Referring to FIG. 5, the session controller 302 receives an instruction for calling the call center from the user interface section 301 by the user's operation of pressing a call center calling button, not shown (step S501).

Then, the session controller 302 reads the session management server URL of the call center connection information shown in FIG. 3A from the HDD 205, and accesses the session management server 104 by using HTTP (step S502).

Then, the session controller 302 reads the first-time connection destination terminal ID of the call center connection information from the HDD 205, and sends the read ID to the session management server 104 to thereby establish a session with the call center terminal 102 (step S503).

The data transmission/reception section 303 transmits and receives voice data, moving image data, and remote control data for the maintenance work to and from the call center terminal 102 using the session established in the step S503 (step S504).

As a consequence, a dialog using voice and moving image communication is started between the user of the image forming apparatus 101 and a receiving operator of the call center terminal 102. After that, the receiving operator is informed of the details of a trouble from the user, and dispatches the details to the call center terminal 103 operated by an appropriate maintenance operator.

The session management server 104 dispatches the session between the image forming apparatus 101 and the call center terminal 102 to a session between the image forming apparatus 101 and the call center terminal 103.

As a consequence, the destination to and from which data is transmitted and received by the data transmission/reception section 303 in the step S504 is changed to the call center terminal 103, and a dialog using voice and moving image communication is started between the user of the image forming apparatus 101 and the maintenance operator at the call center terminal 103.

Further, the image forming apparatus 101 is remotely controlled by the maintenance operator from the call center terminal 103 depending on the details and status of the trouble. Furthermore, there is a case where the image forming apparatus 101 is required to be restarted due to changes of the equipment configuration and changes of the settings depending on the details and status of the trouble.

In a case where the trouble solution processing is continued even after the restart, the maintenance operator sends the start-time redial setting from the call center terminal 103 to the image forming apparatus 101. In a step S505, the data transmission/reception section 303 determines whether or not part of the start-time redial setting information has been received from the call center terminal 103 (step S505). The part of the start-time redial setting information is formed by the redial destination terminal ID and the redial mode expiration date and time.

If it is determined in the step S505 that the part of the start-time redial setting information has not been received (NO to the step S505), the CPU 202 proceeds to a step S507, described hereinafter.

On the other hand, if it is determined in the step S505 that the part of the start-time redial setting information has been received (YES to the step S505), the data transmission/reception section 303 stores the received start-time redial setting information in the HDD 205 (step S506).

Here, not only the received redial destination terminal ID and redial mode expiration date and time, but also the predetermined start-time redial mode and the remaining number of executions of the redial mode are stored. The step S506 corresponds to the operation of a storage unit configured to store, in a case where during connection with the information processing apparatus, the image forming apparatus is required to be disconnected and reconnected after restarting the image forming apparatus, identification information (redial destination terminal ID) for identifying the information processing apparatus to be reconnected, in a storage section (HDD 205).

Then, the power supply controller 304 determines whether or not a restart instruction has been received (step S507).

This restart instruction is provided by the call center terminal 103 in a case where the maintenance operator at the call center terminal 103 is performing the remote maintenance work while remotely controlling the image forming apparatus 101. In this case, the data transmission/reception section 303 receives the restart instruction from the call center terminal 103, and notifies the power supply controller 304 of the received restart instruction.

On the other hand, in a case where the user is performing the maintenance work while operating the image forming apparatus 101, the restart instruction is provided by the user who turns off the power switch of the image forming apparatus 101. In this case, the power supply controller 304 detects switching-off of the power switch.

If it is determined in the step S507 that a restart instruction has not been received (NO to the step S507), the CPU 202 determines whether or not the remote maintenance work has been finished by eliminating the trouble through the remote maintenance work (step S519).

If it is determined in the step S519 that the remote maintenance work has not been finished (NO to the step S519), the CPU 202 returns to the step S504, whereas if the remote maintenance work has been finished (YES to the step S519), the CPU 202 terminates the present process.

On the other hand, if it is determined in the step S507 that the restart instruction has been received (YES to the step S507), the CPU 202 proceeds to a step S508 in FIG. 6, wherein the power supply controller 304 identifies the sender of the restart instruction, and stores the identified sender in the HDD 205. This sender of the restart instruction is the call center terminal 103 in the case where the call center is performing the remote maintenance work while remotely controlling the image forming apparatus 101, and is the user name of the user in the case where the user is performing the maintenance work while operating the image forming apparatus 101. Thus, the restart is performed according to the instruction from the user who performs the maintenance work on the image forming apparatus 101 or the instruction from the information processing apparatus.

Then, the session controller 302 disconnects the image forming apparatus 101 from the session management server 104 and the call center terminal 103 (step S509). Then, the power supply controller 304 restarts the image forming apparatus 101 (step S510). The step S510 corresponds to the operation of a restart unit configured to restart the image forming apparatus.

After restarting the image forming apparatus 101, the session controller 302 reads the start-time redial mode of the start-time redial setting information shown in FIG. 3B, and determines whether or not the start-time redial mode is on (step S511).

If it is determined in the step S511 that the start-time redial mode is off (NO to the step S511), the CPU 202 terminates the present process.

On the other hand, if it is determined in the step S511 that the start-time redial mode is on (YES to the step S511), the session controller 302 reads the redial mode expiration date and time, and determines whether or not the current date and time is before the expiration date and time (step S512).

If it is determined in the step S512 that the current date and time has passed the expiration date and time (NO to the step S512), the CPU 202 terminates the present process. Thus, in the present embodiment, the time limit for reconnection is determined in advance.

On the other hand, if it is determined in the step S512 that the current date and time is before the expiration date and time (YES to the step S512), the session controller 302 reads the remaining number of executions of the redial mode, and determines whether or not the value of the remaining number of executions of the redial mode is equal to 1 or more (step S513).

If it is determined in the step S513 that the value is not equal to 1 or more (NO to the step S513), the CPU 202 terminates the present process. Thus, in the present embodiment, the number of times at which reconnection can be executed is determined in advance.

On the other hand, if it is determined in the step S513 that the value is equal to 1 or more (YES to the step S513), the session controller 302 reads the sender of the restart instruction stored in the HDD 205 in the step S508.

Then, the session controller 302 determines whether or not the sender of the restart instruction is the call center terminal (step S514). If it is determined in the step S514 that the sender of the restart instruction is not the call center terminal, but the user (NO to the step S514), the session controller 302 accepts login from the user (step S515), and proceeds to a step S516, described hereinafter.

On the other hand, if it is determined in the step S514 that the sender of the restart instruction is the call center terminal (YES to the step S514), the session controller 302 reads the session management server URL of the call center connection information shown in FIG. 3A from the HDD 205, and connects to the session management server 104 by using HTTP (step S516). The step S516 corresponds to the operation of a reconnection unit configured to reconnect to the information processing apparatus identified by the identification information (redial destination terminal ID) after the image forming apparatus is restarted (step S510). Further, as described above, in the case where the image forming apparatus 101 is restarted according to the restart instruction received from the user, the image forming apparatus 101 reconnects to the information processing apparatus identified by the identification information (redial destination terminal ID) after the image forming apparatus 101 is restarted and the user logs in the image forming apparatus 101. Further, in the case where the image forming apparatus 101 is restarted according to the restart instruction received from the information processing apparatus, the image forming apparatus 101 reconnects to the information processing apparatus identified by the identification information (redial destination terminal ID) immediately after the image forming apparatus 101 is restarted.

Then, the session controller 302 reads the redial destination terminal ID of the start-time redial setting information from the HDD 205, transmits the read ID to the session management server 104, and establishes a session with the call center terminal 102 (step S517).

Then, the session controller 302 reads the remaining number of executions of the redial mode from the HDD 205, and stores a value obtained by subtracting 1 from the read value in the HDD 205 as the remaining number of executions of the redial mode (step S518).

After that, the CPU 202 returns to the step S504, wherein the data transmission/reception section 303 transmits and receives voice data and moving image data and remote control data for the maintenance work in the session established in the step S517.

With this processing, a session is established between the image forming apparatus 101 and the call center terminal 103 even after the restart, whereby the maintenance operator is enabled to execute processing for solving the trouble.

Further, even in a case where the image forming apparatus 101 is required to be restarted during the remote maintenance performed by the call center for the image forming apparatus, it is possible to restart a session between the image forming apparatus and the call center without bothering a user.

According to the above-described embodiment, during connection with an information processing apparatus connected to transmit and receive maintenance work data for performing the maintenance work on the image forming apparatus 101, in a case where the image forming apparatus 101 is required to be disconnected and restarted, identification information (redial destination terminal ID) for identifying the information processing apparatus to be reconnected is stored in the storage section (step S506), and the image forming apparatus 101 reconnects to the information processing apparatus identified by the identification information after the image forming apparatus 101 is restarted (step S517). Therefore, the image forming apparatus 101 can reconnect to the information processing apparatus without bothering a user.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-168571 filed Aug. 14, 2013, which is hereby incorporated by reference herein in its entirety.

What is claimed is:

1. An image forming apparatus that connects to a call center terminal related to maintenance work on the image forming apparatus, comprising:
   a restart unit configured to restart the image forming apparatus when receiving a remote restart instruction from an operator of the call center terminal or a local restart instruction from a user of the image forming apparatus;
   a receiving unit configured to receive, from the call center terminal, reconnecting information required for reconnection to the call center terminal in a case where the image forming apparatus is restarted, wherein the reconnecting information includes at least identification information of the call center terminal;
   a storage unit configured to store the reconnecting information received by said receiving unit;
   a first determining unit configured to determine whether the image forming apparatus is restarted according to the remote restart instruction or the image forming apparatus is restarted according to the local restart instruction; and
   a reconnection unit configured to
   in a case where it is determined by the first determining unit that the image forming apparatus is restarted according to the remote restart instruction, automatically reconnect to the call center terminal based on the identification information stored by the storage unit, and in a case where it is determined by the first determining unit that the image forming apparatus is restarted according to the local restart instruction, reconnect to the call center terminal subject to the user logging in the image forming apparatus.

2. The image forming apparatus according to claim 1 further comprising a data transmission/reception unit configured to transmit and receive moving image data for performing the maintenance work to and from the call center terminal.

3. The image forming apparatus according to claim 1 further comprising a data transmission/reception unit configured to transmit and receive voice data for performing the maintenance work to and from the call center terminal.

4. The image forming apparatus according to claim 1, wherein the reconnecting information further includes information indicating an expiration date and time, wherein the image forming apparatus further comprises a second determining unit configured to determine whether or not the expiration date and time has been expired, in a case where the image forming apparatus is restarted, wherein the reconnection unit does not reconnect to the call center terminal in a case where it is determined by the second determination unit that the expiration date and time has been expired, wherein the reconnection unit automatically reconnects to the call center terminal in a case where it is determined by the second determination unit that the expiration date and time has not been expired and it is determined by the first determining unit that that the image forming apparatus is restarted according to the remote restart instruction, and wherein the reconnection unit reconnects to the call center terminal subject to the user logging in the image forming apparatus, in a case where it is determined by the second determination unit that the expiration date and time has not been expired and it is determined by the first determining unit that that the image forming apparatus is restarted according to the local restart instruction.

5. A method of controlling an image forming apparatus that connects to a call center terminal related to maintenance work data for performing maintenance work on the image forming apparatus, comprising:

restarting the image forming apparatus when receiving a remote restart instruction from an operator of the call center terminal or a local restart instruction from a user of the image forming apparatus;

receiving , from the call center terminal, reconnecting information required for reconnection to the call center terminal in a case where the image forming apparatus is restarted, wherein the reconnecting information includes at least identification information of the call center terminal;

storing the received reconnecting information;

determining whether the image forming apparatus is restarted according to the remote restart instruction or the image forming apparatus is restarted according to the local restart instruction; and in a case where it is determined that the image forming apparatus is restarted according to the remote restart instruction, automatically reconnecting to the call center terminal based on the stored identification information; and in a case where it is determined that the image forming apparatus is restarted according to the local restart instruction, reconnecting to the call center terminal subject to the user logging in the image forming apparatus.

6. A non-transitory computer-readable storage medium storing a computer-executable program for executing a method of controlling an image forming apparatus that connects to a call center terminal related to maintenance work data for performing maintenance work on the image forming apparatus, wherein the method comprises:

restarting the image forming apparatus when receiving a remote restart instruction from an operator of the call center terminal or a local restart instruction from a user of the image forming apparatus;

receiving , from the call center terminal, reconnecting information required for reconnection to the call center terminal in a case where the image forming apparatus is restarted, wherein the reconnecting information includes at least identification information of the call center terminal;

storing the received reconnecting information;

determining whether the image forming apparatus is restarted according to the remote restart instruction or the image forming apparatus is restarted according to the local restart instruction; and in a case where it is determined that the image forming apparatus is restarted according to the remote restart instruction, automatically reconnecting to the call center terminal based on the stored identification information; and in a case where it is determined that the image forming apparatus is restarted according to the local restart instruction, reconnecting to the call center terminal subject to the user logging in the image forming apparatus.

* * * * *